350-319

3/1/77  OR  4,009,948  SR

United States Patent [19]
Boyan et al.

[11] 4,009,948
[45] Mar. 1, 1977

[54] APPARATUS FOR ENHANCING VISIBILITY IN FOG OR UNDERWATER

[75] Inventors: Gerard E. Boyan, Redding; John L. Rawlings, Westport, both of Conn.

[73] Assignee: The Perkin-Elmer Corporation, Norwalk, Conn.

[22] Filed: Feb. 18, 1975

[21] Appl. No.: 550,268

[52] U.S. Cl. .............................. 350/319; 356/208
[51] Int. Cl.[2] ...................................... G02B 27/17
[58] Field of Search ................ 350/235, 263, 314; 356/103, 207, 208

[56] References Cited

UNITED STATES PATENTS

| | | | |
|---|---|---|---|
| 3,031,351 | 4/1962 | McIlvaine | 350/263 X |
| 3,529,884 | 9/1970 | Ives et al. | 350/7 |
| 3,646,863 | 3/1972 | Winslow | 350/319 UX |
| 3,687,556 | 8/1972 | Price et al. | 350/7 X |

OTHER PUBLICATIONS

Wall et al. "Underwater Viewing," SPIE Seminar Proceedings, vol. 12, pp. 26–31, 1968.

Primary Examiner—Edward S. Bauer
Assistant Examiner—Matthew W. Koren
Attorney, Agent, or Firm—S. A. Giarratana; F. L. Masselle; J. M. O'Meara

[57] ABSTRACT

Apparatus for illuminating and enhancing the visibility of a region in a transparent medium containing light scattering particles, such as fog or smoke in air or particles in water, comprises a source of a beam of illumination that is narrow in one plane and a viewing collimator for narrowly restricting the observer's instantaneous field of view in a single plane having the same general vertical, horizontal or other orientation as the beam of illumination. The viewing collimator and the illuminating source are spaced apart and mounted for relative movement of the collimated instantaneous field of view and the illuminating beam to cause them to intersect in a region in front of and distant from the observer and for the region of their intersection to scan a larger region. This effectively reduces the amount and effect of light scatter from illuminated particles in the foreground which would otherwise tend to dazzle the observer or otherwise obscure distant objects; the observer is thus enabled to see, or to see more clearly, into the illuminated region.

6 Claims, 7 Drawing Figures

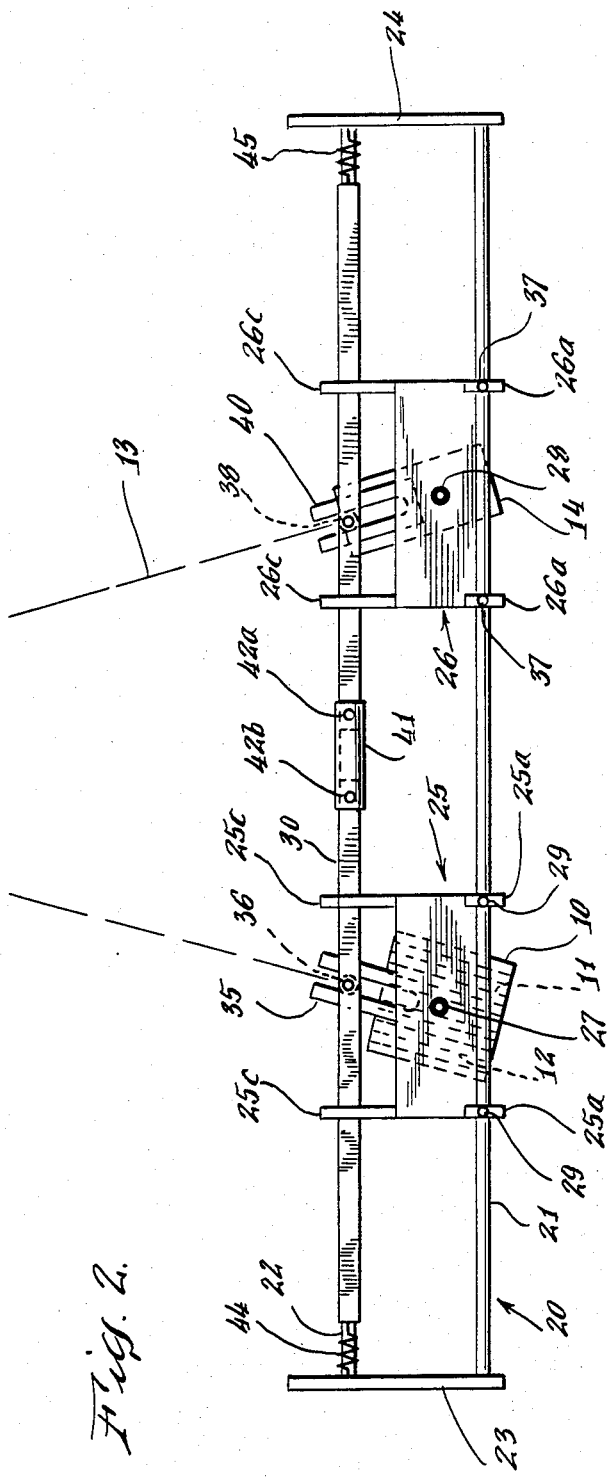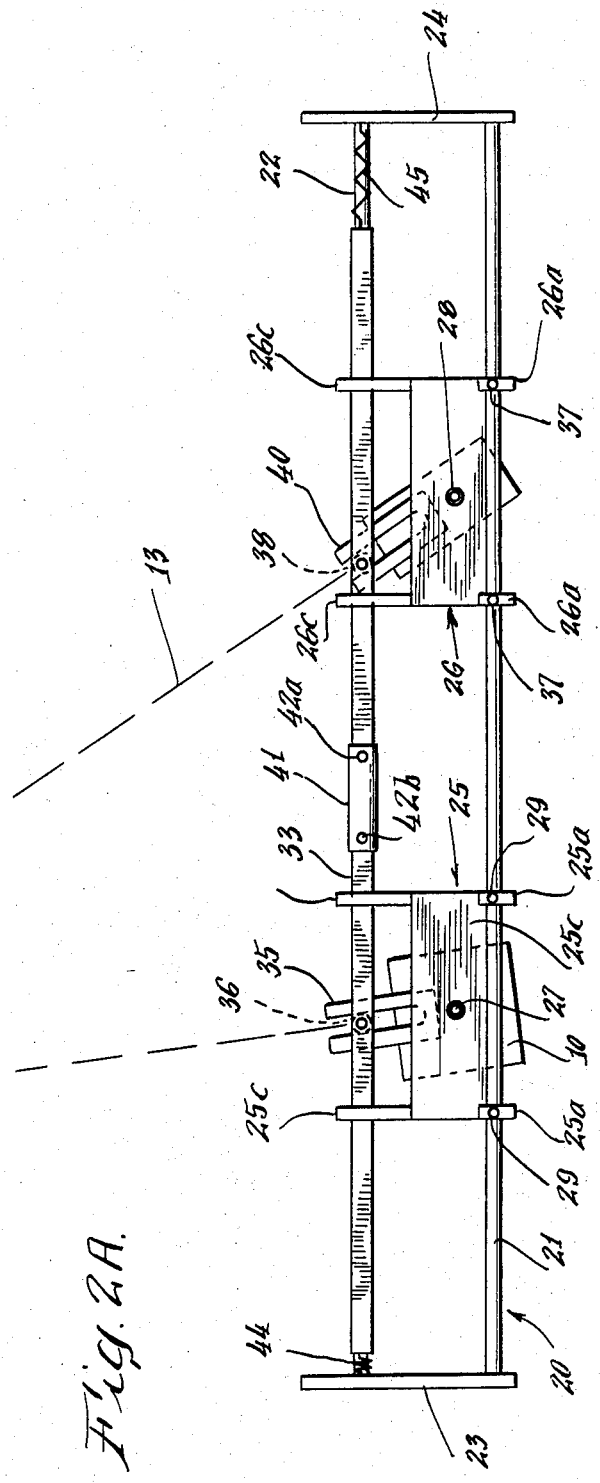

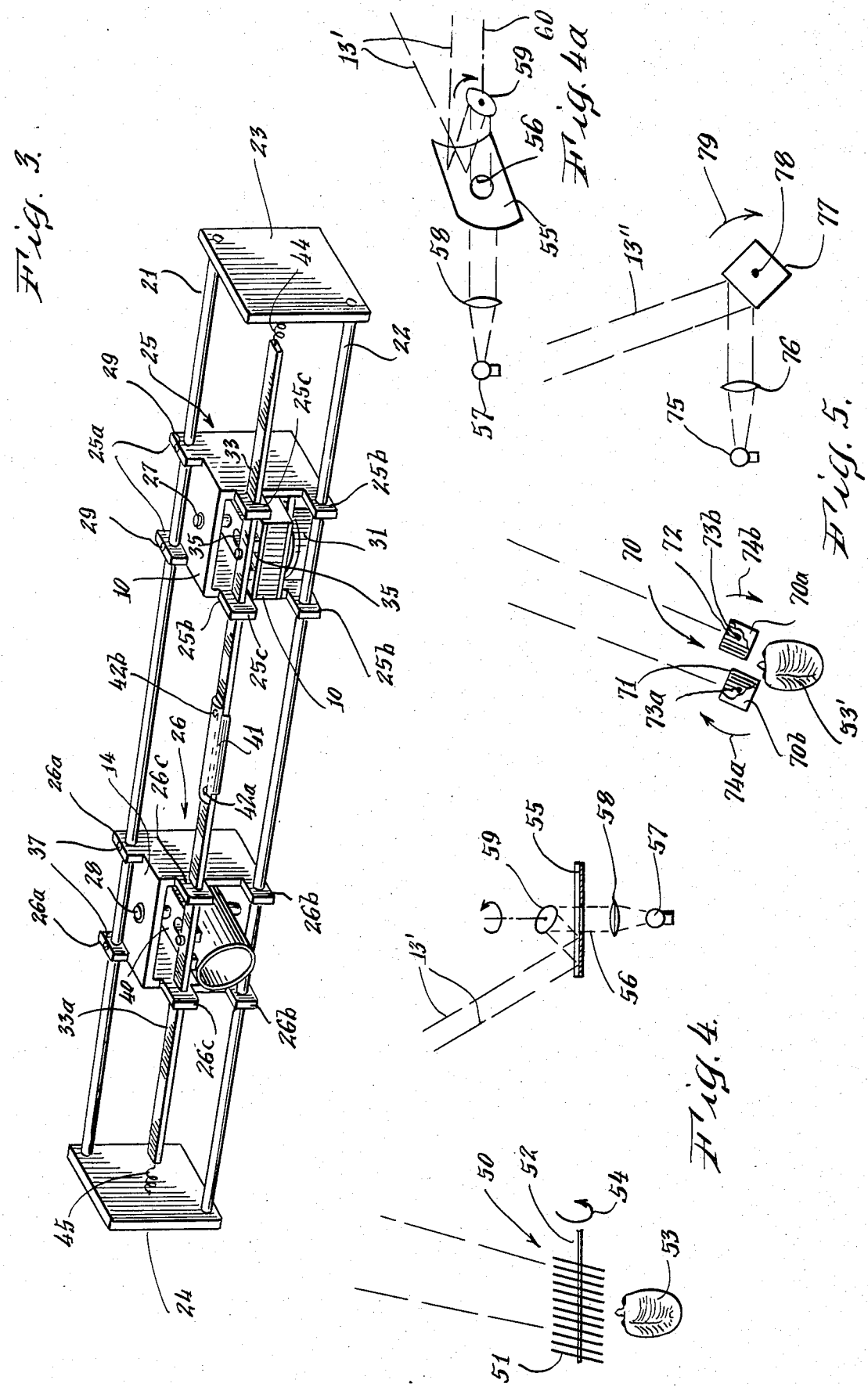

APPARATUS FOR ENHANCING VISIBILITY IN FOG OR UNDERWATER

BACKGROUND OF THE INVENTION

The present invention is apparatus for enhancing an observers ability to see clearly an illuminated area in a partially transparent medium, by reducing the amount and effect of scattered light from illuminated particles in the medium. It is useful in fog, smoke and underwater.

The effect on an observer's visual perception of scatter from illuminated particles is well known to persons who have driven working underwater with portable search lights. Light from the illumination supplied to light up the field of interest in front of the observer is reflected back into the observers eyes and dazzles him, reduces the apparent contrast of details in the scene, reduces his "dark adaption" and generally destroys or inhibits his visual perception.

One known system for reducing the effect of scattered light is range gating in which the illumination is pulsed and a shutter in front of the observer is opened at intervals coinciding with the time at which illumination from the scene to be viewed reaches the observers eyes. However, this system requires relatively complex equipment and is expensive.

It is also customary practice in underwater work to separate the light source from the observer to the greatest extent possible. This eliminates illumination of particles close to the observer and reduces the amount of light scattered back to the observer to some extent, but there is still sufficient light scattered from particles in the foreground to severely restrict the observers perception of the scene.

BRIEF SUMMARY OF THE INVENTION

A principal object of this invention is to provide a system and apparatus for illuminating and viewing clearly a desired region distant from the observer in a partially transparent medium by minimizing the amount and effect of light scattered back to the observer from particles in the medium.

Another object is to provide such a system and apparatus which enables the observer to see clearly over a wide region with minimum interference with his vision from light scattered by particles in the foreground.

A further object is to provide such a system and apparatus which is adapted to be constructed in relatively simple and portable form so as to be easily transported and effectively operated by a single observer.

The system and apparatus of the present invention consist of a source of a beam of light that is collimated or otherwise narrow in one plane including means for swinging the beam to sequentially illuminate successive contiguous portions of a region to be viewed at a distance in front of the observer, and a viewing collimator, which is defined for the purpose of the present invention as an element that restricts the observer's instantaneous field of view in one plane. The viewing collimator and the point of origin of the light beam are spaced apart and are mounted and angularly positioned relative to each other so that the field of view through the viewing collimator and the beam intersect in a region to be viewed a predetermined distance in front of the observer, and they are mounted for relative movement to cause the region of intersection to scan a larger region.

By scanning at a rate at or above the critical flicker frequency, the observers' effective illuminated field of view is enlarged; that is, the region scanned appears to be illuminated continuously and viewed as a whole.

The manner in which illumination scattered back to the observer destroys or severely inhibits his visual perception in the usual and in previously known illuminating and viewing systems, and the manner in which the system and apparatus of this invention reduces the perception destroying amount and effect of scatter back from illuminated particles is subsequently described with reference to FIG. 1 of the drawings.

It is expected that the system and apparatus of the present invention will be most widely used by a live observer utilizing visible light from illumination. It will be appreciated, however, that the system and apparatus is equally suited for taking time exposure still pictures of the scanned region or for taking moving pictures by adjusting the frame rate of the movie camera to pull down one frame per scan, for example. Also, the illumination could be provided by beamed radiation outside the visible, eg. ultraviolet and infrared, in which case a suitable receiving element, sensitive to the type of radiation used, would be placed at the observers position.

In a particular form of the invention the viewing collimator and the source or origin of the beam are mounted, spaced apart with provision for scanning the viewing collimator and light source in synchronism to traverse a desired scan path at a desired rate and at a particular relative angular displacement, which determines the distance in front of the observer at which the beam and instantaneous field of view intersect. This apparatus is adapted to be built in a readily portable form that can be carried by an underwater diver, or frogman, for example, or that can be mounted on a vehicle (land, air or submersible).

Also, in one illustrative form of the apparatus of this invention the relative motions of the viewing collimator and the beam of illumination are controlled in a manner such that scan path or locus of the intersection of the observer's instantaneous field of view and the illuminating beam traverses a generally planar region at a distance in front of the observer, rather than a curved path which is the case if the viewing collimator and beam are swung across the desired region of view both at the same rate. In some situations, as when using apparatus of this invention for exploring a relatively flat ocean floor, for example, a planar, as opposed to a curved region of view, may be desirable to facilitate observing the ocean floor over a wide field of view.

The system and apparatus of this invention is particularly adapted for night time use on vehicles traveling through fog, smog, snow or smoke, by firemen in smoke, or by divers working underwater, when artificial illumination is required and when scattered illumination from suspended particles (fog, smoke, snow or silt), destroys or inhibits the observers perception of the illuminated area.

DESCRIPTION OF THE DRAWINGS

Further, objects, advantages and features of the system and apparatus of this invention will be apparent from the following detailed description of the invention, and of illustrative embodiments thereof, shown in the accompanying drawings in which:

FIGS. 2 and 2a are top plan view of one form of apparatus embodying the invention, showing respectively different relative positions of viewing element and lamp assembly;

FIG. 3 is a perspective view of the embodiment shown in FIG. 2;

FIG. 4 is a top plan view of another embodiment;

FIG. 4a is a perspective view of the beam source, of the FIG. 4 embodiment; and

FIG. 5 is a top plan view of still another embodiment.

DETAILED DESCRIPTION

Figure 1:
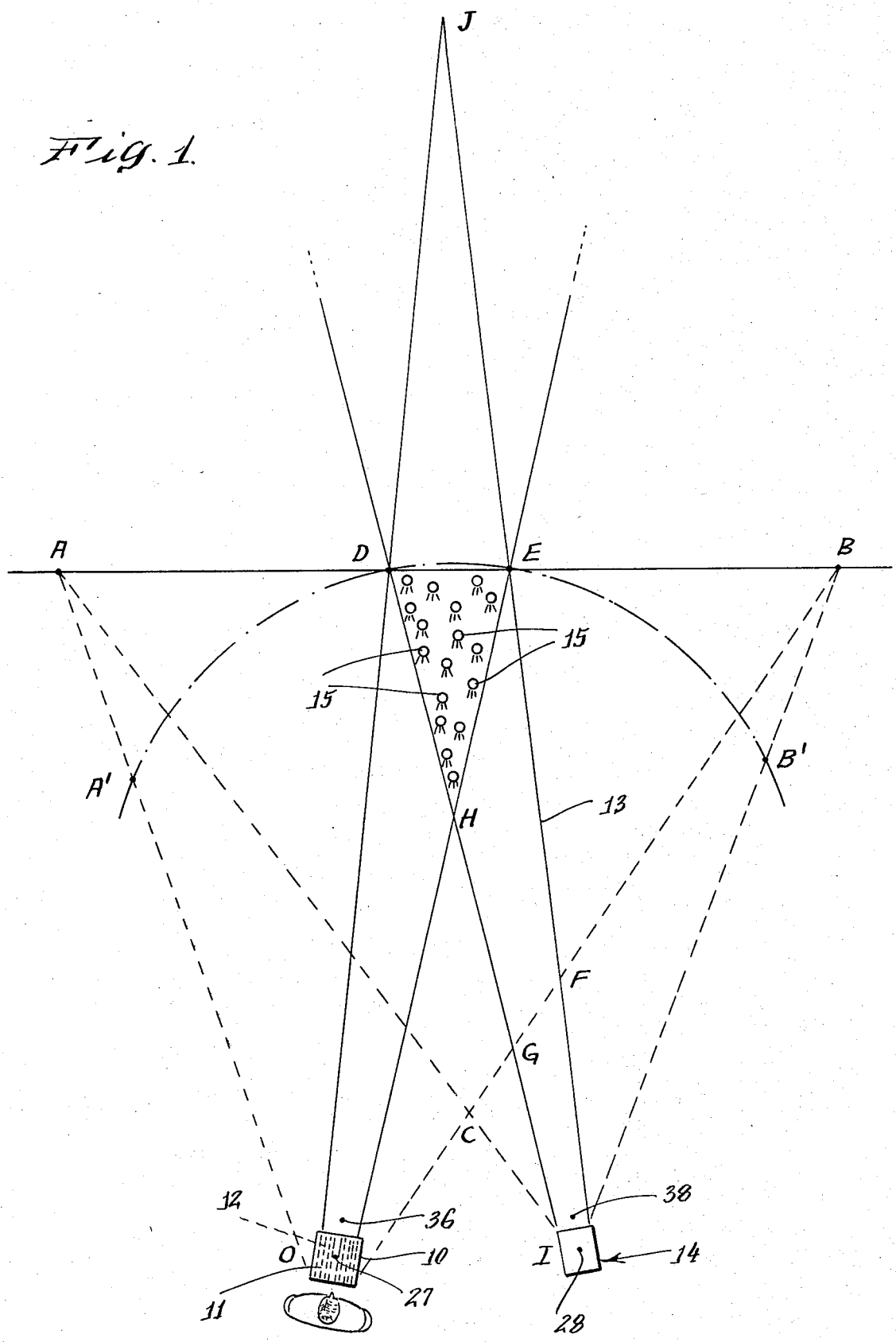
FIG. 1 is a diagrammatic illustration of the structure and mode of operation of the system and apparatus of this invention.

Referring to FIG. 1 of the drawings, the line A-B represents a plane in a region of a trasparent medium containing suspended particles that is to be viewed by an observer at O with the assistance of a source of artificial illumination I. In the usual situation, as with an automobile driver or a diver working underwater, when a source of diverging illumination I illuminates the area A-B for an observer O to view the region O-A-B, suspended particles in the triangular area A-B-I are illuminated and scatter illumination; the illuminated particles in triangular region ABC in particular scatter or reflect illumination back to the observer O, dazzling him, reducing the apparent contrast of physical features in the region O-A-B, reducing the observers dark adaption:, and generally destroying or inhibiting the observers visual perception of the region and any objects or features therein.

The size of the area A-B-C of obscuring backscatter may be reduced to some extent by moving the source of illumination I further from the observer O, but there are practical limits to the extent to which the source of illumination can be spaced from the observer O, as in the case of motor vehicles or firemen or divers working in close quarters, for example.

One alternative is to use a narrow beam of illumination I, such as a searchlight beam or other collimated beam of light, illustrated by region I-D-E, which reduces the illumination region to the relatively narrow one within I-D-E. In this instance, scatter comes to the observer O from particles illuminated in the region D-E-F-G.

In accordance with the system and apparatus of the present invention the amount of scatter back to the observer O from a collimated beam of illumination from source I, which is spaced from the observer O, is reduced to a minimum by restricting the observer O's field of view to a narrow area, such as the area D-E, by suitable means such as a viewing element 10 which has a narrow slot 11 or plurality of parallel slots 11 that define a narrow field of view (illustrated by region D-E) for the observer O looking through the slot or slots. The slot or plurality of parallel slots are suitably formed by blackened parallel plates or vanes 12. Preferably a plurality of parallel slots 11 are provided to give the observer biocular vision; additionally the spacing of the plates in relation to their widths in the axial direction of the observation is made wide enough to provide comfortable eye relief and permit considerable head movement. The narrow or collimated beam 13 of illumination from the source I may suitably be provided by a lamp assembly 14 incorporating a lamp and collimating lens in a conventional manner. The narrow beam of illumination and the narrow field of view provided by the viewing element 10 need not be the same width, but for purposes of efficiency, and to optimize the reduction of scattered illumination reaching the observer, they are suitably made nearly the same width, as indicated in FIG. 1.

The observer's field of view through the viewing element 10 is narrow in one plane and the beam 13 is also preferably collimated to be narrow in one plane, (as by utilizing a cylindrical lens) which extends in the same general directions, (normal to the drawing sheet in the embodiment illustrated) as the plane of the observers narrow field of view, so that the illuminated region, D-E-H defined by the intersection of the beam 13 and the observers field of view is narrow in one direction only, the horizontal direction in the system illustrated in the drawings.

With the foregoing narrow field of view and a narrow beam of illumination intersecting at D-E, the amount of scattered illumination which interferes with the observers vissual perception is reduced to the amount of illumination reflected back from the particles designated 15, illuminated in the relatively small region D-E-H. While this limits the observers instantaneous width of field of view to the narrow region between D and E and observer is enabled to view the wider region between A and B by synchronously swinging the observers instantaneous field of view and the beam so their intersection (D-E) scans the larger region, A to B. Moreover, by swinging the intersection at a rate at or above the observer's critical flicker frequency, the observer is enabled to see the entire, larger, region between A and B as an uninterrupted whole.

The distance in front of the observer O of the widest portion of the instantaneous illuminated field of view D to E, is adjustable by changing the angular relationship of the viewing element 10 and the lamp assembly 14, or other source I of illumination, so as to move the intersection of the beam 13 and observer's instantaneous field of view close in to, or further out from, the observer O. For this purpose, the viewing member 10 is suitably mounted to pivot about a point 27 (defined by shaft 27 in FIG. 2) and the lamp assembly 14 suitably mounted to pivot about a point 28 (defined by shaft 28 in FIG. 2) and both the viewing element 10 and the lamp assembly 14, with their pivotal mountings are mounted on supports arranged so that the distance between them, and their angular relation, can be adjusted. Suitable mountings enabling these adjustments are illustrated in the apparatus embodying the invention, shown in FIGS. 2 and 3 and subsequently described in detail.

If the viewing element 10 and the beam 13 are swung through equal angles around the pivot points, 27 and 28 respectively, the locus of the intersection D-E of the instantaneous field of view and the beam 13 will be a circle A'-B'-I-O. It is frequently desirable to have the intersection traverse a planar region, indicated by the straight line A-B. Such a planar path is suitably provided by having the pivotal movements of the viewing element 10 and lamp assembly 14 constrained relative to each other at points spaced in front of, or behind, their pivot points in a manner such that the points of constraint are maintained a fixed distance apart and move along a line that is parallel to a line between their pivot points, 27 and 28, as they pivot about their pivot points for scanning. This is illustrated in FIG. 1, wherein the viewing element 10 and the lamp assembly 14 pivot about the respective pivot points 27 and 28.

FIGS. 2 and 3 illustrate apparatus embodying the invention wherein a viewing element 10 and a lamp assembly 14 are mounted to pivot on a frame 20 which is formed by a pair of rods 21 and 22 fixed between end plates 23 and 24. The lamp assembly 14 may be a focussed searchlight or a lamp in combination with reflective or refractive collimating optics to provide a narrow or collimated fan shaped beam of light.

The viewing member 10 and lamp assembly 14 are pivotally mounted, respectively, in open ended boxes 25 and 26 by shafts 27 and 28, passing down through the tops of the respective boxes, these shafts 27 and 28 defining the pivot points 27 and 28 referred to above. The boxes 25 and 26 are slideably mounted on the bars 21 and 22 of the frame for synchronous oscillatory pivotal movement of the viewing member and lamp assembly relative to the frame.

The box 25 is slidably carried on the frame rods 21 and 22 by the rods passing, respectively through apertured ears 25a projecting up from the top and apertured ears 25b projecting forward from the lower edge portions of the sides of the box 25. Box 25 is slideably mounted on the frame rods 21, 22 by having the rod 21 pass slideably through the apertured ears 29a, 29b and the rod 22 pass slideably through the apertured ears 30a, 30b. The box 25 is fixed in a desired position along the frame rods by set screws 29 threaded down through the ears 25a to bear on rod 21.

Another pair of apertured ears 25c on box 25 project forward from the upper edge portions of the sides of the box and a drive rod 30 is slideably carried through the ears 25c as part of the drive mechanism, subsequently described, for pivotally oscillating the viewing element 10 and lamp assembly 14.

The viewing member 10 is pivotally supported in the upper portion of the box 25, by the shaft 27 which is fixed through the viewing member 10 and has its upper and lower ends journalled in the walls of the box. A torquer 31 is mounted on the bottom of the box 25 and the lower end of the shaft 27 is connected to the torquer 31 for pivoting the shaft, and hence the viewing element 10 fixed thereto, back and forth a limited angular amount, suitably about 60°.

Fixed on top of the viewing element 10 and extending forward therefrom, is a bifurcated lever 35 which engages a stud 36 attached on the underside of the drive rod 30. Pivoting the viewing element 10 by operation of the torquer 31 thus oscillates the drive rod 30 longitudinally and, through connections to be described, correspondingly and simultaneously rotates the lamp assembly 14.

The box 26, in which the lamp assembly 14 is mounted is, like the box 25 slideably mounted on the rods 21, 22 by the rods 21 passing slideably through a pair of apertured ears, 26a, which project up from the top of the box and through a pair of apertured ears, 20b, which project out from the lower front edge portions of the box. The box 26 is fixed in a selected position along the rods by set screws 37 threaded down through the ears 26a to bear against rod 21.

The lamp assembly 14 is pivotally mounted in a box 26 by the shaft 28 which is fixed through the lamp assembly and which has its end journalled in the walls of the box.

The drive rod 30 is slideably received through another set of apertured ears 26c extending forward from the upper front edge portions of the box 26, and is connected to pivot the lamp assembly 13 by a stud 38 on the rod portion 30 received in the bifurcation lever 40 that is fixed on the top of the lamp assembly 14.

The range of the apparatus, which is the distance in front of the observer 0 at which his field of view through the viewing element 10 intersects the beam 13 from the lamp assembly 14, is adjusted by moving the boxes 25 and 26 closer together or further apart along the rods 21 and 22; this causes the viewing element and lamp assembly to pivot, in the respective boxes, relatively about the studs 36 and 38 on the drive rod 30 thereby changing their angular relation to each other. For an additional or alternative adjustment of this angular relation provision is made for changing the distance between the studs 36 and 38 by lengthening or shortening the portion of the drive rod 30 between them. For this purpose, the rod 30 is broken at about the midpoint between the studs 36 and 38, and the adjacent rod ends at the break are slideably received in a sleeve 41 and are secured in adjusted relative position therein by set screws 42, 42b thread through the sleeve 41 to bear on the respective end portions of the rod 30.

Since the lamp assembly 14 is linked to the viewing element 10 by the rod 30 engaging the studs 36 and 38, they are both oscillated simultaneously at the same average rate by the power drive supplied by the torquer 31 which drives the viewing element as previously described.

In addition to providing the drive connection between the viewing element 10 and the lamp assembly 14, the drive rod 30 connection also constrains the relative pivotal movements of the viewing element and lamp assembly for the intersection of the field of view through the viewing element and the beam 13 to traverse a planar region, as described above with reference to FIG. 1. Specifically the studs 36 and 38 on rod 30 are a fixed distance apart and the rod 30 is constrained by its mounting through the ears 25c and 26c of the viewing element and lamp assembly, boxes 25 and 26, respectively, so that the rod 30, and the pivot points defined by the studs 36 and 38, are constrained to oscillate along a line parallel to and spaced from, a line between the pivot points of the viewing element and a lamp assembly that are defined by the shafts 27 and 38 in boxes 25 and 26, respectively.

The viewing member and lamp assembly, or other scanning beam illuminating system, may be oscillated in a variety of modes, the particular mode of operation not being critical to the invention.

In terms of power consumption and possible construction cost the most efficient mode of oscillation is the sinusoidal or simple harmonic motion. The apparatus embodiment shown in FIGS. 2 and 3 is constructed to operation in this mode. For this purpose, springs 44 and 45 are connected, respectively, between the ends of the drive rod 30 and the frame end plates 23 and 24 to urge the rod 30, and hence the viewing element and lamp assembly toward their mid-scan position. This arrangement constitutes a "spring-mass" system which has a natural period of vibration determined by the mass of the oscillatory members and the spring rate or stiffness of the springs, the only power required to maintain the oscillation is that necessary to make up for friction losses, or to slow down or speed up the mean scan rate.

FIG. 4 illustrates schematically another embodiment of the invention utilizing a different form of viewing element, 50, and a different arrangement for providing the scanning beam, 13'.

In this FIG. 4 embodiment the viewing element consists of a plurality of discs 51 secured in parallel, spaced apart relation on a rotatable shaft 52 and at an oblique angle to the shaft. The number of discs is selected so that an observer 53 looking through the row of discs has biocular vision of a narrow field of view through the slits formed by the discs, the width of the field of view being defined by the spacing and dimensions of the discs. It will be seen that as the shaft 52 rotates about its axis in the direction of arrow 54 the observers field of view through the disc array moves to the left for a one half turn of the shaft and then back to the right for the next half turn, so that the observers instantaneous narrow field of view scans back and forth once for each rotation of the shaft 52.

An alternative means for providing an effective scanning beam, 13' shown in FIGS. 4 and 4a consists of a cylindrical mirror section 55 which is reflective on its concave surface and which has aperture 56 through its center, and a lamp 57 and collimating lens 58 aligned to direct a collimated beam of light through the aperture 56 from the convex side of the mirror 55, onto a rotatably supported mirror 59. The mirror 59 is mounted obliquely relative to its axis of rotation, which coincides with the optical axis of lens 58 and with the center of the aperture 56 and is angularly positioned to reflect collimated radiation proceeding through aperture 56 from lens 58 onto the reflective concave surface of mirror 55 from which the beam 13' is reflected. As the mirror rotates, in synchronism with rotation of the viewing element 50, the radiation reflected therefrom onto the concave reflective surface of mirror 55 impinges on successive portions of the mirror 55 surface in a generally circular path around the aperture 56 and is thereby reflected out as a beam 13' which is as narrow as the collimated beam from lens 58 but expanded vertically, normal to the axis of generation of the cylindrical mirror surface, which axis is horizontal as shown. As mirror 59 rotates, the horizontal direction of beam 13' oscillates in synchronism with the field of view through the discs 51.

The structure of the FIG. 4 embodiment is particularly adapted for high scan rates.

A particular advantage of the rotating type of viewing element 50 and the scanning beam 13' utilizing a rotating mirror 59, as in the FIG. 4 embodiment is that rotary motion is generally more easily and economically provided than oscillatory motion and can more easily be dynamically balanced to be vibration free. This embodiment also allows the observer considerable freedom of head motion.

FIG. 5 illustrates still another embodiment of the invention having another alternative form of means providing the scanning beam, 13 inches of illumination. The viewing element is provided by a pair of rotatable, open-ended boxes 70a, 70b, each having slots 71 therein, provided by parallel plates or vanes 72 for limiting the field of view of the observer 53'. The boxes 70a, 70b are mounted for rotation about vertical axis 73a, 73b respectively in front of the observers eyes and are rotated synchronously in the direction of arrows 74a, 74b to cause the restricted field of view to scan from left to right.

The means for scanning a beam of illumination radiation 13 inches in the FIG. 5 embodiment consists of a light source 75 and a collimating lens 75, or mirror system, to collimate and direct light from source 75 onto a rotating polygon 77 which has reflective sides for deflecting the collimated as a beam 13 inches. The reflective polygon 77 is rotated about a vertical axis 78 in the direction of arrow 79 at the same rate as the viewing element boxes 70a, 70b, the relative angular positions of the boxes 70a, 70b and the reflective polygon 77 are arranged so that the intersection of the viewing field of view and beam 13 inches is at the desired range and scans from left to right, through the scan direction is not critical.

The FIG. 5 embodiment is adapted for a constant scan rate.

It will be appreciated that other forms of viewing systems could be devised for the purpose of restricting the observers field of view to a narrow band. For example, viewing elements might be constructed utilizing one or more rotating discs normal to the observers line of sight, with slits in the discs. Or as an alternative to having parallel plates or vanes 12 mounted in a rotatable viewing element 10, as in the embodiment shown in FIGS. 2 and 3, each of the plates could be mounted to be independently pivotable about its own axis with the plates mounted in parallel spaced relation and linked to pivot simultaneously in parallel, similar to a venetian blind.

Also, in systems wherein the view through the viewing element is recorded on film, ie. the observers is a camera, the viewing element for a still camera, might be provided by a focal plane shutter of conventional construction, but with the shutter speed synchronized with the scan rate of the narrow beam of illumination. For a movie camera, a rotating disc type shutter could be utilized by providing synchronism between the rotation of the discs and the scan of the illuminating beam.

It might also be desirable to provide additional optical elements or systems in front of the viewing elements to magnify, sharpen or otherwise enhance the field of view as seen by the observer.

Other illuminating systems might also be utilized, the critical point being to have illumination applied to the portion of the region to be viewed that is within the observers field of view through the viewing element at any given moment, and not apply to adjacent areas at the same time. It is, therefore, not necessary for the illumination to emanate from a single source close to the observer. For example, apparatus could be provided wherein a number of separate sources of illumination where set up to illuminate separate areas of the region to be viewed, such as portions of an airfield runway, and were turned on as the respective areas came into the field of view through the viewing element, and were immediately turned off as the field of view moved to the next successive area.

What is claimed is:

1. Apparatus for enhancing the visibility of a region that is at a distance and separated from an observer by an intervening medium containing light scattering particles, comprising:

means for illuminating successive incremental areas of said region, said incremental areas being narrow relative to the extent of said region in the direction in which the successive illumination progresses and substantially coextensive with said region transversely of said direction; and a viewing element for restricting the observer's field of view to correspond spatially and temporally with the successively illuminated areas of said region, said viewing element being displaced from said illumination means in said direction in which successive illumination progresses, said viewing element including:

a. a plurality of plates arranged in spaced parallel relation to form a plurality of slots defining the field of view of the observer and b. means for directing said field of view to the successively illuminated areas of said region while maintaining the spaced parallel relation between said plates to cause said field of view to scan across said region contemporaneously with the progression of illumination of said incremental areas, thus enhancing visibility of said region by limiting the illumination back scattering reaching the observer.

2. The apparatus of claim 1 wherein said plates of said viewing element are disposed in a unit which is mounted for rotation about an axis disposed transversely of said direction and positioned to provide the observer with a view of the successively illuminated areas of said region over a range of rotational positions.

3. The apparatus of claim 1 wherein said plates of said viewing element are obliquely mounted as a unit on an axis, said axis being disposed parallel to said direction, said unit being mounted for rotation about said axis, whereby the observer is provided with a view of the successively illuminated areas of said region over a range of rotational positions.

4. Apparatus for enhancing the visibility of a region that is at a distance and separated from an intervening medium containing light scattering particles, comprising:

means for illuminating successive narrow portions of said region including a generally cylindrical section having a reflective concave surface, and means for rotating a narrow beam of radiation and for directing said beam to said concave surface with said beam being reflected to said region at successively different angles relative to the axis of said cylindrical section;

a viewing element for restricting the observer's field of view to correspond with the successively illuminated portions of said region, said viewing element being separated from said illumination means in the direction which the successively illuminated portions of said regions are narrow;

means for directing said viewing element to the successively illuminated portions of said region, said apparatus enhancing the visibility of said region by reducing the illumination that is scattered back to the observer.

5. Apparatus for enhancing the visibility of a region that is separated from the observer by an intervening medium of light scattering particles, comprising:

means for directing a beam of radiation to illuminate successive narrow portions of said region, said beam directing means being a pivotally mounted member which swings said beam about a first pivot point;

a viewing element for restricting the observer's field of view to correspond with the successively illuminated portions of said region, said viewing element being separated from said beam directing means in the direction which the successively illuminated portions of said region are narrow and being pivotally mounted to swing said field of view about a second pivot point;

said beam directing member and said viewing element having third and fourth pivot points respectively, at one side of a line through said first and second pivot points and spaced therefrom; and rigid, rod-like means extending between and connected to said beam directing member and to said viewing element at said third and fourth pivot points, whereby when either of said beam directing member or said viewing element is rotated, the other rotates simultaneously therewith and said rod-like means constrains the pivotal movement of said beam directing member relative to the pivotal movement of said viewing element so that the successively illuminated portions of said region and said field of view continuously intersect in a plane.

6. The apparatus of claim 5 wherein said rod-like means includes means for varying the distance between the third and fourth pivot points to adjust the range of said plane in which the successively illuminated portions of said region and said field of view continuously intersect.

* * * * *